United States Patent [19]
Rumpel

[11] 3,811,727
[45] May 21, 1974

[54] SEAT BELT ANCHOR MECHANISM FOR ADJUSTABLE SEAT

[75] Inventor: Harvey R. Rumpel, West Allis, Wis.

[73] Assignee: Universal Oil Products Company, Des Plaines, Ill.

[22] Filed: Dec. 15, 1972

[21] Appl. No.: 315,719

[52] U.S. Cl............ 297/385, 248/393, 280/150 SB, 297/216
[51] Int. Cl....................... A62b 35/00, B60r 21/10
[58] Field of Search ........... 297/385, 389, 388, 216; 280/150 SB; 248/393, 394, 395, 396, 397, 398, 399, 424, 429; 296/65 R, 65 A

[56] References Cited
UNITED STATES PATENTS

| | | | |
|---|---|---|---|
| 3,463,543 | 8/1969 | Zellar............................. | 297/216 |
| 3,746,393 | 7/1973 | Andres......................... | 280/150 SB |
| 3,170,728 | 2/1965 | Barenyl......................... | 248/395 X |
| 3,737,197 | 6/1973 | Hall............................... | 280/150 SB |
| 3,582,133 | 6/1971 | De Lavenne................... | 297/216 |
| 3,207,554 | 9/1965 | Dall .............................. | 297/385 |
| 3,147,995 | 9/1964 | Bohlin........................... | 297/385 |
| 3,493,211 | 2/1970 | Barecki et al.................. | 248/399 |

FOREIGN PATENTS OR APPLICATIONS

| | | | |
|---|---|---|---|
| 1,231,123 | 12/1966 | Germany........................ | 297/385 |

Primary Examiner—James T. McCall
Attorney, Agent, or Firm—James R. Hoatson, Jr.; Barry L. Clark; William H. Page, II

[57] ABSTRACT

Seat belt anchor mechanism for vertically movable suspension seat having fore and aft adjustment feature provides an anchor point for a lap belt which is spaced from the vehicle floor and movable relative to the floor. The anchor point is on a guide member carried by a slide on the upper movable seat frame and is movable vertically with the seat suspension but remains stationary when the movable seat frame is adjusted fore and aft. The guide member and anchor point are carried at the end of a pivot link attached at its rearward end to the floor or rear wall of the vehicle at such an angle as to fully support the anchor point and eliminate the necessity for an auxiliary tether belt. The mechanism permits the lap belt to remain relatively stationary relative to the occupant, regardless of the amount of movement of the suspension.

4 Claims, 3 Drawing Figures

SEAT BELT ANCHOR MECHANISM FOR ADJUSTABLE SEAT

BACKGROUND OF THE INVENTION

This invention relates to an anchor mechanism for a seat belt and more particularly, to such a mechanism for use with a suspension seat having a large amount of vertical travel for isolating the occupant from shocks and vibrations, and substantial horizontal travel for adjusting the position of the seat fore and aft to the position most comfortable to a particular occupant, or to position various size occupants more ideally to operate the vehicle.

Although the conventional floor mounting for a seat belt is quite satisfactory for an automobile wherein the seat permits a very limited degree of vertical motion, it is not satisfactory for use with a suspension seat which generally provides four or more inches of vertical travel. In suspension seats, it has been common to anchor the lap belt to the movable side frame of the seat and then anchor the movable seat frame to the floor with a tether belt which is adjusted to be taut in the extreme upper position of the suspension. An example of such a mounting can be seen in U.S. Pat. No. 3,493,211. A problem with the last mentioned type of mounting arises when the seat is of the type having a capability of being adjusted in a fore and aft direction. Since a typical adjustment range for such a seat is about four inches, it will be readily appreciated that the movable seat frame to the floor tether belt must be sufficiently long to accommodate the entire range of vertical seat movement while the seat is in its extreme forward position. When the seat is in any other fore and aft position, the tether belt will be slack in the uppermost position of the seat suspension and therefore incapable of offering any restraint until after the seat has been damaged by being moved upwardly beyond its upper limit. Co-pending application Ser. No. 213,572, now U.S. Pat. No. 3,737,197 assigned to a common assignee solves the aforementioned problem by providing a forward mounted pivot link which provides an anchor point which remains relatively fixed with respect to a seat occupant during vertical motion but requires a rear mounted tether to carry the loading. Co-pending application Ser. No. 213,621, now U.S. Pat. No. 3,758,158, solves the problem by providing a rear mounted multi-element pivot linkage to maintain the seat belt anchor point relatively fixed relative to the seat occupant but also requires a tether member to carry the loading.

SUMMARY

The seat belt anchor mechanism of the present invention overcomes the necessity for a tether belt on a suspension seat by anchoring the lap belt to a support member which is free to move up and down with the seat but which is restrained from moving horizontally at any vertical position of the seat by being connected to a pivot link which is firmly connected at its lower end to the floor, rear wall, or other frame portion of the vehicle at the rear of the seat and at its upper end to the support member. The support member includes a guide portion which cooperates with a slide member affixed to the movable seat frame to permit the seat and slide member to move horizontally relative to the guide portion so that the seat can be adjusted fore and aft without affecting the ability of the pivot link to carry any load transmitted to the support member from the occupant through the lap belt. The slide member also transmits the vertical motion of the seat frame and suspension to the guide portion which moves up and down generally vertically but in a slight arc by virtue of being mounted at the end of an elongated pivot link pivotally mounted to the floor of the vehicle. The arc-like movement causes the support points for the lap belt to move slightly rearwardly as the seat moves to its upper position, thus slightly tensioning the lap belt around the occupant when the seat is in the position usually assumed in a crash situation.

DESCRIPTION OF THE PREFERRED EMBODIMENT

Figure 2:
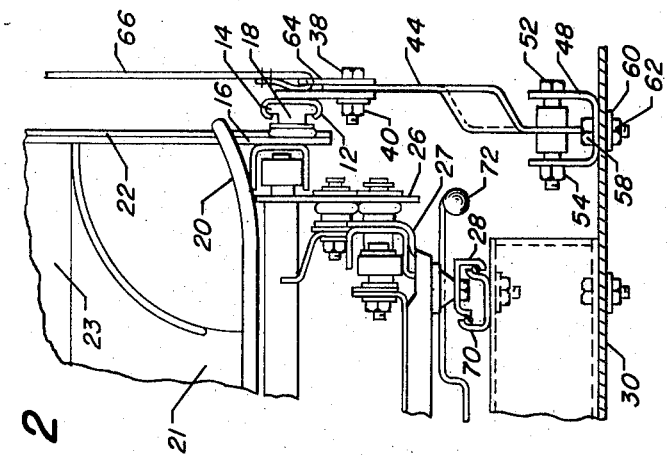
FIG. 2 is a front plan view showing the seat belt anchor mechanism and a fragmentary portion of the seat structure.
Figure 1:
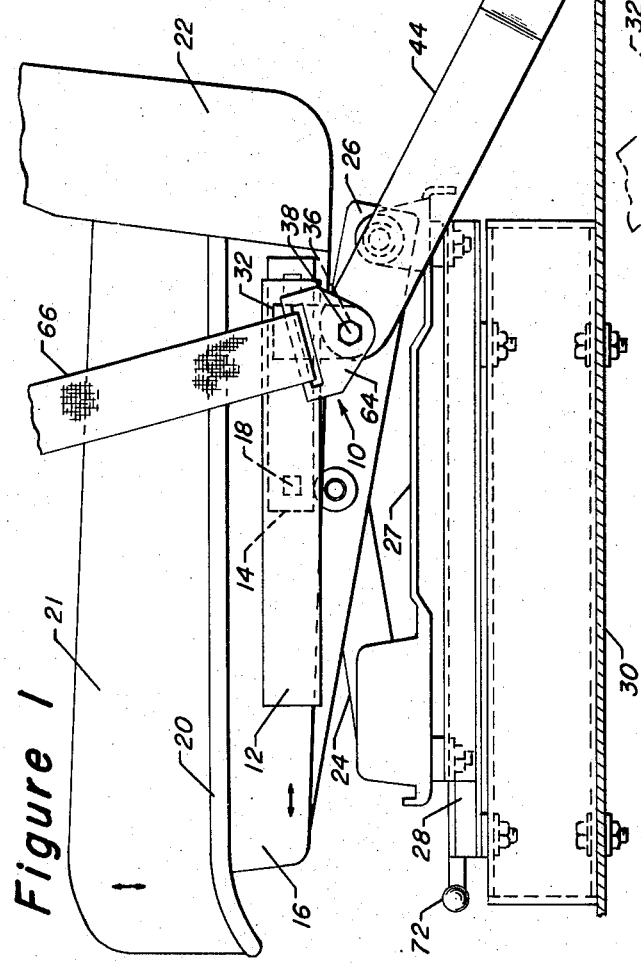
FIG. 1 is a side plan view showing the improved seat belt anchor mechanism in its installed position attached to a suspension seat and to the floor of a vehicle and with the seat in its midride position.

Referring to FIG. 1, the improved seat belt anchor mechanism is indicated generally at 10 and includes a guide member 12 which cooperates with slide member 14 mounted therein for horizontal movement. The slide member 14 is mounted to the side of the movable seat frame 16 by means of fasteners 18. Mounted on the top of the seat frame 16 is a seat pan 20 which is preferably covered with cushioning material 21. A back support frame member 22 is pivotally fastened on the seat frame member 16 and is adapted to support a back cushion member 23. The seat pan member 20 can move upwardly and downwardly to absorb vibrations of the vehicle since it is mounted to a suspension system, such as the system shown in U.S. Pat. No. 3,109,621, and including springs (not shown), a shock absorber (not shown) and first and second scissors link members 24, 26 which are pivoted to each other and supported at their lower ends on a lower or main frame 27 carried by seat track member 28 which is movable fore and aft relative to the floor 30 of the vehicle.

Affixed to the guide member 12, such as by welding, is a support member 32 in the form of a plate having a lower support hole 36. A support bolt or pin 38 mounted in the lower support hole 36 and retained by a nut or other retaining means 40 mounts the support member 32 to an elongated pivot link member 44 which is pivoted relative to the floor 30 of the vehicle on a bracket 48 which supports the lower end of the pivot link 44. The pivot link 44 is mounted to spaced holes in the bracket member 48 by means of a fastener such as bolt 52 and nut 54. The floor bracket 48 is attached to the floor 30 by means of a floor bolt 58, washer 60 and nut 62.

A mounting member 64 on the end of each half of a lap belt 66 mounts the lap belt to a bolt 38 fastened through hole 36 in support member 32. The lap belt is preferably made of a web material such as nylon and is conventional.

To provide a capability of fore and aft horizontal adjustment movement, the upper movable seat frame 16 is connected through links 24, 26 and lower frame 27 to a seat track member 28 which rides on and is guided by a floor track member 70 mounted on the floor 30 of the vehicle. The horizontal adjustment lever 72 is operated in the usual manner to release pawl means (not shown) on the seat track member 28 from track member 70 in order to adjust the seat to any desired horizontal position.

Figure 3:
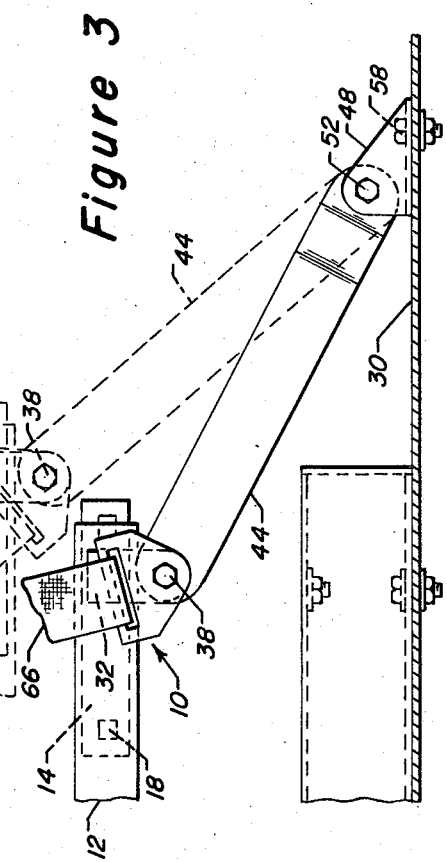
FIG. 3 is a side plan view similar to FIG. 1 but showing a fragmentary portion of the seat belt anchor mechanism in combination with a lap belt when the seat is in its extreme upper and lower positions.

Referring to FIG. 3, it will be evident that fore and aft adjusting movement of seat frame 16 and slide member 14 carried by it will have no effect on the position of anchor member 32 and guide member 12 since the latter members are pivotally mounted to the vehicle frame 30 by pivot link 44. Furthermore, the rearwardly angled mounting of the link 44 transmits loads directly from the lap belt 66 to the frame 30 regardless of the fore and aft position of the seat and without the necessity for additional tether means. Since the seat occupant does not tighten his lap belt 66 until after he has adjusted the seat to a particular fore and aft position, it will be appreciated that the tension on the belt 66 will remain substantially constant as the seat bounces up and down through its range of vertical movement. The only variation in tension is that caused by the horizontal component of movement of the support bolt 38 which moves in an arc about pivot axis 52. This horizontal component is evident in FIG. 3 by comparing the solid line position of the support member 32 to the dotted line position. The horizontal movement is of some advantage since it slightly tightens the belt 66 when the seat is up, which would usually be the position assumed in an accident when the operator is thrown forward.

I claim as my invention:

1. A seat belt anchor mechanism for pivotally anchoring one end of a seat belt to each side of a suspension seat having an upper seat support frame movable vertically and horizontally relative to a lower seat frame and to the floor of a vehicle to which the lower seat frame is adapted to be fastened, characterized in that said anchor mechanism comprises slide means including a guide member and a slide member slidable on said guide member, one of said members being fixed to said upper seat support frame and the other of said members being pivotally connected by a rearwardly and downwardly directed rigid pivot link to the vehicle frame at a pivot point behind the seat, and seat belt anchor support means integral with said other of said members and movable therewith, said anchor support means being movable vertically in response to up and down movements of said upper seat support frame but remaining stationary relative to the lower seat support frame in response to horizontal fore and aft adjustment movements of said seat support frame, the pivot links on each side of said seat being positioned so as to receive all of the loading imparted to the seat belt by an occupant and transmit it to the vehicle frame.

2. A seat belt anchor mechanism in accordance with claim 1 wherein said guide member is elongated and is longer than said slide member.

3. A seat belt anchor mechanism in accordance with claim 2 wherein said slide member is mounted on said upper seat support frame.

4. A seat belt anchor mechanism in accordance with claim 3 wherein said pivot link is mounted to said vehicle floor by a bracket to which it is pivotally mounted.

* * * * *

Disclaimer 3,811,727.—*Harvey R. Rumpel*, West Allis, Wis. SEAT BELT ANCHOR MECHANISM FOR ADJUSTABLE SEAT. Patent dated May 21, 1974. Disclaimer filed Aug. 29, 1975, by the assignee, *UOP Inc.*
  Hereby enters this disclaimer to claims 1, 2, 3 and 4 of said patent.
  [*Official Gazette March 9, 1976.*]